United States Patent [19]

Weis

[11] 4,107,038
[45] Aug. 15, 1978

[54] METHOD AND APPARATUS FOR REMOVING GRIT

[75] Inventor: Frank George Weis, Kansas City, Mo.

[73] Assignee: Ecodyne Corporation, Lincolnshire, Ill.

[21] Appl. No.: 824,183

[22] Filed: Aug. 12, 1977

[51] Int. Cl.$^2$ .............................................. B03B 5/48
[52] U.S. Cl. .................................. 210/84; 210/532 S
[58] Field of Search .................. 210/735, 84, 83, 197, 210/513, 521, 532 R, 532 S, 456, 528; 55/459 R

[56] References Cited

U.S. PATENT DOCUMENTS

| 2,419,004 | 4/1947 | Bieker et al. | 210/16 |
| 3,865,721 | 2/1975 | Kaelin | 210/7 |
| 3,941,698 | 3/1976 | Weis | 210/208 |

*Primary Examiner*—William A. Cuchlinski, Jr.
*Assistant Examiner*—Jon Hokanson
*Attorney, Agent, or Firm*—Charles M. Kaplan; Joel E. Siegel

[57] ABSTRACT

Grit is removed from liquid sewage by flowing such sewage into a settling chamber and causing the sewage to flow in a toroidal pattern around the periphery of the chamber. Grit falls to the floor of the settling chamber and passes radially to and then through a central opening into a grit collection chamber therebeneath. Organic solids are kept in motion in the toroidal flow pattern, or lifted from the settling chamber floor into such flow pattern, and are discharged through an outlet adjacent the upper surface of the liquid in the settling chamber. Toroidal flow is created and maintained by obstructing the tangential flow path of incoming sewage with a baffle which blocks the tangential inlet and has an edge extending above the upper surface of the liquid. A propeller rotating about a vertical axis in the center of the chamber is adjustable so as to keep the contents of the chamber impinging against the baffle as they flow around the tank in the toroidal pattern.

11 Claims, 6 Drawing Figures

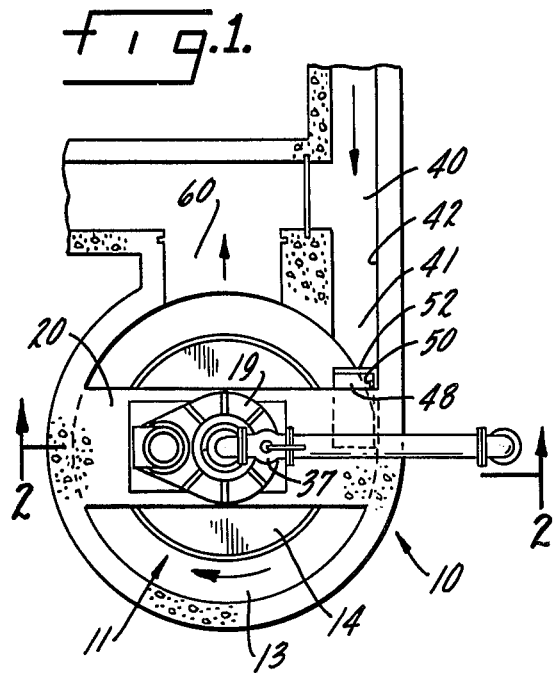
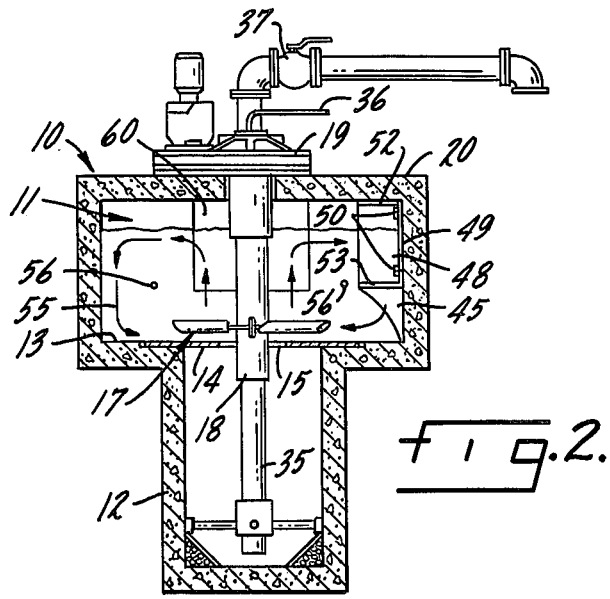
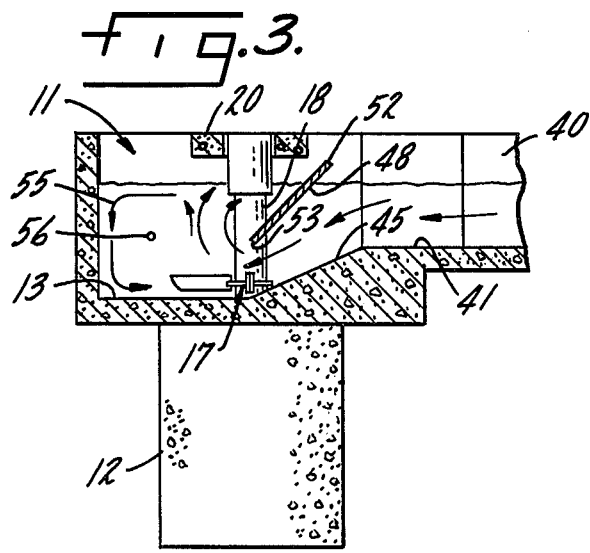
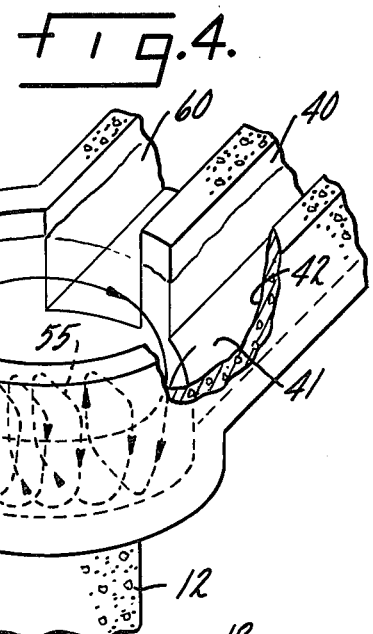
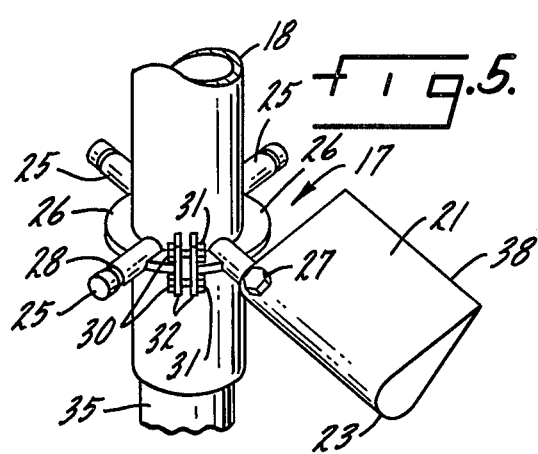
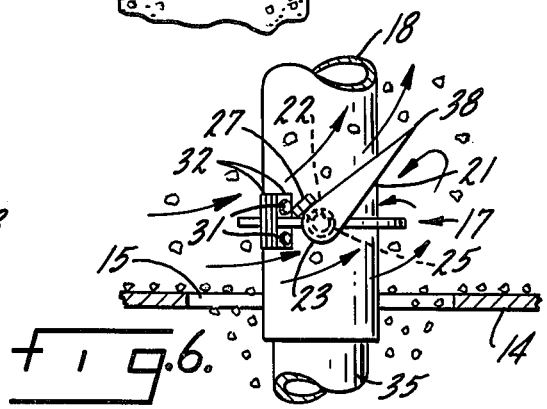

METHOD AND APPARATUS FOR REMOVING GRIT

BACKGROUND OF THE INVENTION

This invention relates to the separation of grit from liquid sewage, and more particularly to improvements in the ability to remove fine grit of grit selectors of the general type disclosed in U.S. Pat. No. 3,941,698, which is assigned to the same assignee as this invention. Such grit selectors produce a forced vortex with an upward spiral flow that moves settled grit across a transition surface into a grit removal opening while keeping or lifting organics into suspension in the spiral flow until they are discharged into a sewage treatment unit. Such grit selectors were significantly better than the devices which preceded them, and this invention involves modifications which make the subject grit selectors even better.

SUMMARY OF THE INVENTION

Accordingly, it is an object of this invention to provide improved methods and apparatus for removing grit from liquid sewage.

Another object is to provide a method of increasing the amount of grit in the size range of about 50–100 mesh that is removable from domestic sewage.

Another object is to increase the ability of a grit selector propeller to lift settled organic sewage solids without appreciably increasing energy consumption.

Another object is to enable a grit selector to handle sewage entering at a velocity in the turbulent range.

Another object is to reduce the speed of a grit selector propeller while maintaining its ability to lift organic solids.

Another object is to prevent stringy sewage from fouling a grit selector propeller.

Other objects and advantages of the invention will be apparent from the specification and claims, and the scope of the invention will be pointed out in the claims.

DESCRIPTION OF THE DRAWING

FIG. 1 is a top plan, schematic representation of an improved grit selector.

FIG. 2 is a side view taken along the line 2—2 in FIG. 1.

FIG. 3 is a side view showing the position of the baffle.

FIG. 4 is an isometric schematic representation of a toroidal flow pattern.

FIG. 5 is an enlarged isometric view of a propeller in accordance herewith.

FIG. 6 is a side view of the propeller of FIG. 5.

DESCRIPTION OF THE INVENTION

The drawing shows apparatus 10 for separating grit from incoming liquid sewage. A right circular cylindrical settling chamber 11 is disposed immediately above and concentric with a cylindrical grit storage chamber 12 of lesser diameter. A substantially flat transition surface or floor 13 including a removable plate 14 centered in chamber 12 separates chambers 11 and 12. A circular opening 15 in the center of plate 14 permits communication between chambers 11 and 12. The surfaces of apparatus 10 defining chambers 11 and 12 may be made from concrete.

A multi-bladed propeller 17 is mounted on a hollow cylindrical shaft 18 for rotation about a vertical axis centered in opening 15, the diameter of shaft 18 being substantially less than that of opening 15. The top of shaft 18 is connected to a conventional variable speed gear box and motor assembly 19 supported on a platform 20 for rotating propeller 17 at various speeds that impart a rotary motion to sewage in chamber 11 about the axis of shaft 18. Each blade 21 of propeller 17 has a cylindrical hole 22 at its inner end adjacent its rounded leading edge 23. Each hole 22 telescopes over a stub shaft 25 which is attached to a semi-circular clamp member 26. A set screw 27 threads into a tapped hole in each blade 21 and engages a groove 28 on one of the stub shafts 25. Set screws 27 hold blades 21 on stub shafts 25 and permit adjustment of the pitch of blades 21. A pair of clamp members 26 surround shaft 18 and are connected to each other by nuts 30 threaded on to bolts 31 which pass through aligned holes in plates 32, which are welded at right angles to each end of clamp members 26. The height of propeller 17 above surface 13 may be adjusted by loosening nuts 30 and sliding members 26 to the required elevation. Shaft 18 may be concentric with and rotate about an air lift pipe 35 which employs air pipe 36 and a control valve 37 so as to operate in the same manner disclosed in the aforementioned U.S. Pat. No. 3,941,698.

The rounded leading edge 23 of each blade 21 is enlarged and substantially circular in cross section. Blades 21 taper uniformly from their leading edge 23 to their sharp trailing edge 38. The large rounded leading edge 23 of each blade 21 prevents stringy sewage solids from adhering to and fouling propeller 17. The stringy solids will slide off one side or the other of blade 21 depending on which side has the greater water resistance.

An inlet trough 40 has a flume portion 41 with one edge 42 that tangentially intersects the upper portion of settling chamber 11. This causes the incoming stream of liquid sewage to flow tangentially into chamber 11. A ramp 45 extends downwardly from flume 41 to transition surface 13. Ramp 45 should intersect transition surface 13 at an acute angle of from about 2° to 26°. This will produce a Coanda effect on ramp 45 which causes grit to follow the ramp down to transition surface 13.

The liquid sewage rotating in chamber 11 is impinged against a flat plate baffle 48 which obstructs and is essentially normal to the tangential flow path of the sewage coming in through flume 41. Baffle 48 may have an integral right angle flange 49 attached by bolts 50 to the side wall of settling chamber 11 at tangential edge 42. Baffle 48 is at least as wide as flume 41 and has an upper portion 52 which extends above the surface of the liquid in chamber 11. As shown in FIG. 3, all portions of baffle 48 are located above ramp 45 and its lower edge 53 is spaced above transition surface 13. The plane of baffle 48 should intersect transition surface 13 at an angle of from about 40° to 50°.

The liquid rotated by propeller 17 and the liquid entering chamber 11 through flume 41 will be deflected downwardly into a generally toroidal flow pattern 55 that spirals around the periphery of chamber 11 in the manner shown in FIG. 4. The centroid of toroidal flow pattern 55 is a circle 56 that lies in a horizontal plane and is concentric with chamber 11. Impingement of the liquid against baffle 48 reduces its circumferential velocity while increasing its toroidal velocity; this causes the liquid to make more spiral revolutions as it travels around the periphery of chamber 11, which increases the amount of grit hitting and settling on surface 13 as a result of centrifugal force. The toroidal motion of the liquid moves the grit on surface 13 to its center opening 15 through which grit drops into storage chamber 12. Grit and organic solids may be removed from chamber 12 in the manner described in the aforementioned U.S. patent.

Largely grit-free liquid sewage and organic solids flow out of apparatus 10 through an outlet trough 60 that extends to the top of settling chamber 11 at its outer periphery. Troughs 40 and 60 extends downwardly for about three-quarters of the depth of chamber 11, and the troughs are spaced apart about 270° in the direction of toroidal liquid flow. Propeller 17 rotates the liquid about its vertical axis at a greater speed than that of the liquid flowing in the toroidal pattern, and this lifts some settled organic solids into the toroidal flow pattern and permits their discharge through trough 60.

One of the most difficult types of grit to remove from sewage is very fine silicacious particles in the size range of about 50-100 mesh. Field tests were conducted on domestic liquid sewage flowing into a sewage treatment plant at a rate of about twelve million gallons per day. A grit selector (designated A) as disclosed in the aforementioned U.S. patent was utilized to gather data on grit removal, and then the grit selector was modified so that it had the structure and method of operation disclosed herein (designated B). Grit samples were taken from the liquid sewage flowing into such apparatus, and grit samples were taken from the liquid leaving through the outlet trough. The test results showing the percentage removal of grit having a specific gravity of about 2.0 are tabulated below:

|           | Grit Size |         |
|-----------|-----------|---------|
| Apparatus | 50 Mesh   | 80 Mesh |
| A         | 52        | 42      |
| B         | 98        | 88      |

The tests reveal that in the troublesome size range of about 50 to 100 mesh, apparatus B as disclosed herein removed about twice as much grit as the prior art. Apparatus A and B had about the same effect in removing grit particles in the size ranges substantially above and below about 50-100 mesh. Observation of apparatus B revealed that the liquid and solids in chamber 11 were flowing in an essentially toroidal pattern, as described above, and that stringy solids did not adhere to blades 21.

It has thus been shown that by the practice of this invention the ability of a grit selector to remove fine grit particles can be substantially increased. This occurs when the liquid is made to flow in an essentially toroidal path by impinging all liquid flow against an obstruction located and constructed as described above. The use of a propeller with variable pitch, speed and height enables the toroidal flow pattern to be controlled to achieve optimum performance with the particlar liquid sewage being treated. The speed of propeller rotation can be minimized to save energy, but propeller 17 will always rotate faster than the liquid in chamber 11 because baffle 48 will slow the liquid; this ensures that propeller 17 will cause some upward pumping action lifting settled organic solids into the toroidal flow path no matter how slowly it is turning. If additional pumping action is needed the pitch of blades 21 can be increased. Although the liquid in apparatus 10 should be in the laminar flow range, incoming liquid in trough 40 can be in the turbulent flow range because impingement of the incoming liquid against baffle 48 will slow such liquid sufficiently to prevent disruption of the toroidal flow pattern.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for separating grit from liquid sewage while retaining organic solids therein, comprising:
    (a) a circular settling chamber;
    (b) a grit storage chamber disposed immediately below said settling chamber;
    (c) a transition surface separating said settling chamber and said storage chamber, said transition surface having a centrally disposed opening therethrough permitting communication between said settling chamber and said storage chamber;
    (d) a multi-bladed propeller mounted for rotation in a predetermined direction about a vertical axis centered in said opening, said blades being adjustable as to height above said transition surface, pitch, and speed of rotation;
    (e) an inlet trough having flume portion with one edge which intersects the upper portion of said settling chamber essentially tangentially thereto for flowing a tangential stream of liquid sewage into said settling chamber;
    (f) a ramp extending downwardly from the intersecting edge of said flume portion to said transition surface at an acute angle with said transition surface for guiding grit to said transition surface;
    (g) a baffle extending into said settling chamber adjacent to said flume potion at essentially a right angle to said edge of said flume portion which is tangential to said settling chamber, said baffle being at least as wide as said flume portion and having an upper portion extending above the surface of the liquid in said settling chamber, the lower edge of said baffle being spaced above said transition surface at an acute angle with said transition surface, said upper portion of said baffle being closer to said edge of said flume portion than said lower edge of said baffle, said baffle being positioned so that liquid moved by said propeller and all liquid entering said settling chamber through said flume portion impinges against said baffle and is deflected into a generally toroidal flow pattern moving in said predetermined direction of propeller rotation around said settling chamber with the centroid of such toroidal flow pattern being a circle lying in a horizontal plane and being concentric with said settling chamber; and
    (h) outlet means for removing grit-free liquid and organic solids from an upper portion of said settling chamber along the outer periphery thereof.

2. The invention defined in claim 1, wherein said baffle is a flat plate.

3. The invention defined in claim 2, wherein all portions of said baffle are located above said ramp.

4. The invention defined in claim 1, wherein said propeller comprises a pair of semi-circular clamps adjustably bolted around a rotatable vertical shaft, a plurality of stub shafts project from said clamps at right angles to said shaft, and each blade of said propeller telescopes over one of said stub shafts and is adjustably attached thereto by a set screw.

5. The invention defined in claim 1, wherein said acute angle between said baffle and said transition surface is from about 40° to 50°.

6. The invention defined in claim 1, wherein said acute angle between said ramp and said transition surface is from about 2° to 26°.

7. The invention defined in claim 1, wherein each blade of said propeller has a rounded leading edge that is substantially thicker than its trailing edge, and said blades taper uniformly from leading edge to trailing edge.

8. Apparatus for removing grit from liquid sewage while retaining organic solids therein, comprising:
   (a) a right circular cylindrical settling chamber;
   (b) a cylindrical grit storage chamber, having a smaller diameter than said settling chamber, disposed immediately below said settling chamber;
   (c) a substantially flat transition surface separating said settling chamber and said storage chamber, said transition surface having a center opening therethrough permitting communication between said settling chamber and said storage chamber;
   (d) a multi-bladed propeller mounted for rotation in a predetermined direction about a vertical axis centered in said opening, said blades having a large rounded leading edge and taperng uniformly to a sharp trailing edge, and being adjustable as to height above said transition surface, pitch and speed of rotation;
   (e) an inlet trough having a flume with one edge which intersects the upper portion of said settling chamber essentially tangentially thereto for flowing a tangential stream of liquid sewage into said settling chamber;
   (f) a ramp extending downwardly from the intersecting edge of said flume to said transition surface at an angle of from about 2° to 26° with said transition surface for guiding grit to said transition surface;
   (g) an essentially flat plate baffle extending into said settling chamber adjacent to said flume at essentially a right angle to said edge of said flume which is tangential to said settling chamber, said baffle being at least as wide as said flume and having an upper portion extending above the surface of the liquid in said settling chamber, all portions of said baffle being located above said ramp, the lower edge of said baffle being spaced above said transition surface at an angle of from about 40° to 50° with said transition surface, said upper portion of said baffle being closer to said edge of said flume portion than said lower edge of said baffle, said baffle being positioned so that liquid moved by said propeller and all liquid entering said settling chamber through said flume impinges against said baffle and is deflected into a generally toroidal flow pattern moving in said predetermined direction of propeller rotation around the periphery of said settling chamber with the centroid of such toroidal flow pattern being a circle lying in a horizontal plane and being concentric with said settling chamber, said baffle maintaining the speed of said liquid in said toroidal flow pattern to a value less than the speed of rotation of said propeller, whereby said propeller lifts settled organic solids from said transition surface into said toroidal flow pattern; and
   (h) outlet means for removing grit-free liquid and organic solids from an upper portion of said settling chamber along the outer periphery thereof, said outlet means being spaced from said inlet means by a distance equal to a substantial portion of the circumference of said settling chamber in the direction of toroidal liquid flow.

9. The invention defined in claim 8, wherein said propeller comprises a pair of semi-circular clamps adjustably bolted around a rotatable vertical shaft, a plurality of stub shafts project from said clamps at right angles to said shaft, and each blade of said propeller telescopes over one of said stub shafts and is adjustably attached thereto by a set screw.

10. The method of removing grit in the size range of about 50–100 mesh from liquid sewage while retaining organic solids therein, comprising the steps of:
   (a) confining such liquid sewage in a circular container having a vertical longitudinal axis and a hole through its bottom at its center;
   (b) flowing such liquid sewage tangentially into said circular container adjacent its upper surface;
   (c) imparting rotatory motion to such liquid sewage about said axis;
   (d) impinging the rotating sewage against an obstruction which is essentially normal to the tangential flow path of incoming sewage which deflects said sewage downwardly toward said bottom into a generally toroidal flow pattern centered around said axis, with the centroid of such toroidal flow pattern being a circle lying in a horizontal plane concentric with said container;
   (e) settling grit on to said bottom and removing such grit through said hole; and
   (f) removing liquid sewage and organic solids at a location adjacent to the liquid upper surface.

11. The invention defined in claim 10, wherein said motion about said axis is imparted by rotating said liquid at a greater speed than that of the liquid flowing in said toroidal pattern, whereby settled organic solids are lifted from said bottom into said toroidal flow pattern.

* * * * *